United States Patent [19]
Koch

[11] Patent Number: 5,383,643
[45] Date of Patent: Jan. 24, 1995

[54] KEYBOARD COVER AND COPY HOLDER

[75] Inventor: Richard C. Koch, Trabuco Cyn, Calif.

[73] Assignee: C-2, Inc., Chicago, Ill.

[21] Appl. No.: 36,925

[22] Filed: Mar. 25, 1993

[51] Int. Cl.⁶ .......................................... A47B 97/04
[52] U.S. Cl. ................................. 248/447; 248/452; 248/918; 400/714
[58] Field of Search ............. 248/447, 452, 457, 918, 248/912, 442.2, 441.1, 448; 400/713, 714, 718

[56] References Cited

U.S. PATENT DOCUMENTS

| | | | |
|---|---|---|---|
| 999,539 | 8/1911 | Anderson | 400/718 |
| 2,505,814 | 5/1950 | Voorhorst | 248/442.2 |
| 3,136,082 | 6/1964 | Slover | 248/447 |
| 4,546,947 | 10/1985 | Gesten | 248/918 |
| 4,635,893 | 1/1987 | Nelson | 400/718 X |
| 4,671,688 | 6/1987 | Brashears | 400/714 |
| 4,778,128 | 10/1988 | Evenson | 248/448 |
| 5,028,048 | 7/1991 | Watson et al. | 248/441.1 X |
| 5,177,665 | 1/1993 | Frank et al. | 248/918 X |
| 5,193,925 | 3/1993 | Foulke | 400/713 X |

FOREIGN PATENT DOCUMENTS

| | | | |
|---|---|---|---|
| 1359013 | 9/1964 | France | 248/447 |
| 1390426 | 1/1965 | France | 248/447 |

OTHER PUBLICATIONS

Keyboard Cover/Copyholder-Two Products In One.
Hard Top Keyboard Covers, by Basic Needs, Inc., p. 501.
Keyboard Cover and Copyholder, by Basic Needs, Inc., p. 501.
Hard Keyboard Cover, *CompUSA-The Computer SuperStore* catalog, p. 53.

*Primary Examiner*—Ramon O. Ramirez
*Assistant Examiner*—Korie H. Chan
*Attorney, Agent, or Firm*—Tilton, Fallon, Lungmus & Chestnut

[57] ABSTRACT

A keyboard cover and copy holder includes a first plate member and a second plate member pivotally connected at one end to the first plate member. The second plate member pivots between a first position in which it and the first plate member have a flat configuration and a second position in which it and the first plate member lie at an acute angle.

7 Claims, 1 Drawing Sheet

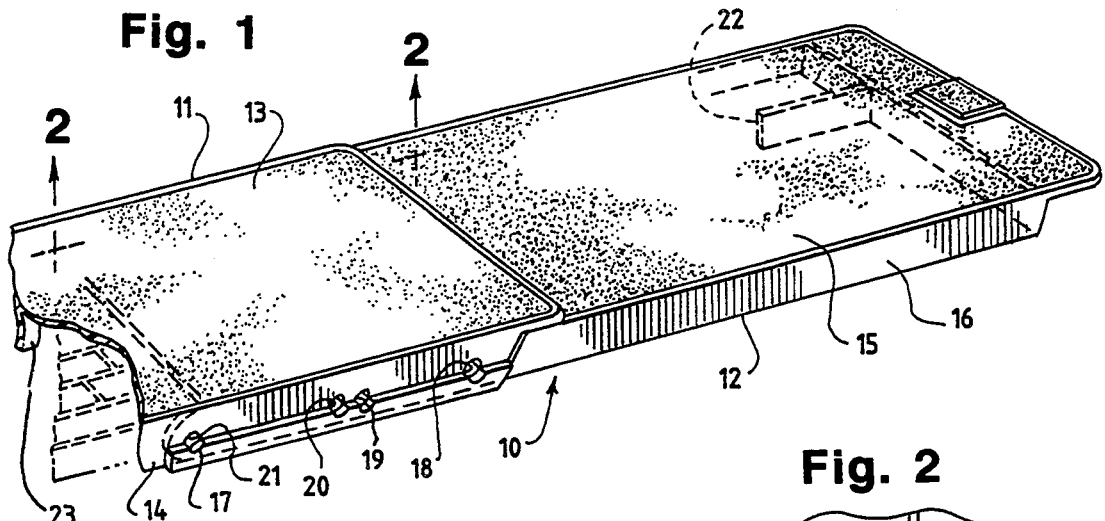
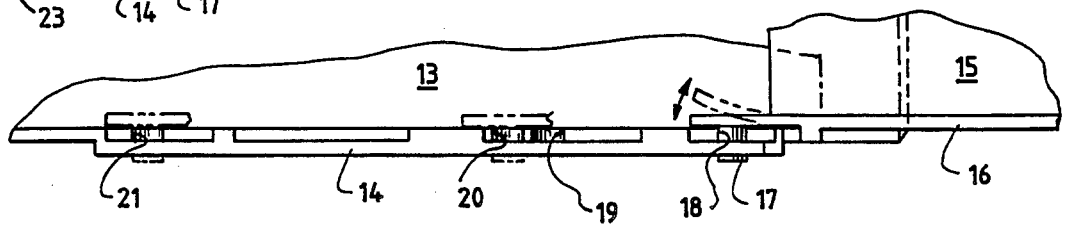
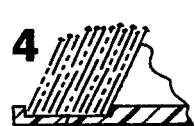
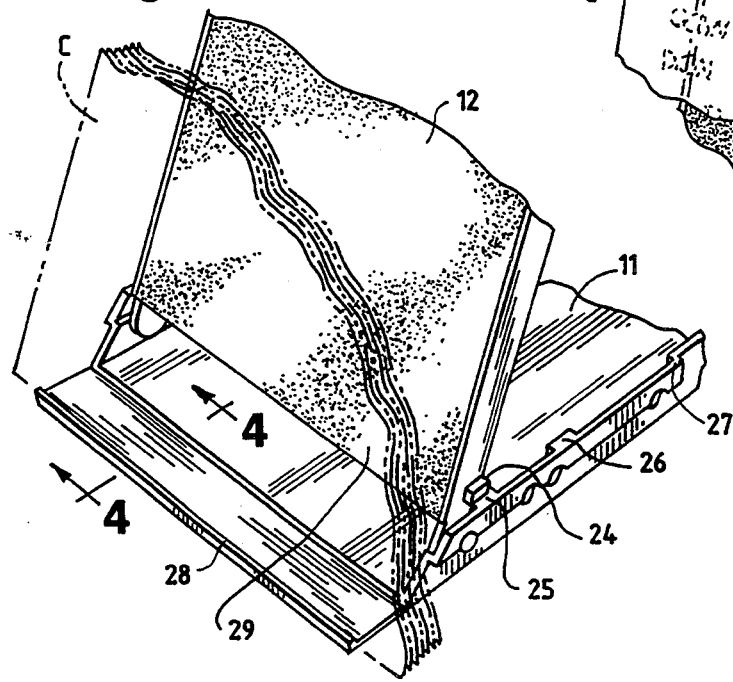
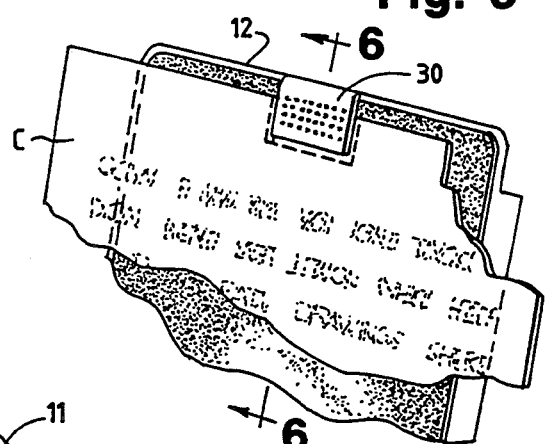

KEYBOARD COVER AND COPY HOLDER

BACKGROUND OF THE INVENTION

The present invention relates to an apparatus for covering a keyboard and holding copy, and more particularly to a device with components which pivot between one position in which they serve as a cover and another position in which they serve as a holder.

The prior art includes a wide variety of keyboard covers for covering a computer keyboard when no one uses it. It also includes a wide variety of copy holders, which support copy so that an operator may view it and enter its contents into a computer. Finally, the prior art includes devices which serve as both keyboard covers and copy holders.

The prior devices identified above suffer a host of disadvantages. First, having a separate cover and holder requires storage of one device during use of the other. Separate devices also increase the number of accessories and typically, their cost. The prior devices that serve as both a cover and holder usually include complex attachments for securing to the keyboard where they may block a user's view of the computer screen.

The apparatus of the present invention avoids the disadvantages of the prior devices and effectively functions as a keyboard cover and a copy holder. It is a simple construction that minimizes the cost of manufacture and assembly and provides reliable and effective performance. It allows adjustment in its size so that it may cover a wide variety of keyboards of different size. It also allows a user to place it in any desired position when it holds copy.

SUMMARY OF THE INVENTION

In accordance with one embodiment of the present invention, a keyboard covering and copy holding apparatus includes a first plate member and a second plate member pivotally connected to the first plate member. The second plate member pivots between a first position in which it and the first plate member have a flat configuration and a second position in which it and the first plate member lie at an acute angle.

The first and second plate members each include a main plate segment for extending above the keys of the keyboard and a flange segment which extends perpendicularly to the main plate segment. The flange segments define a space for receiving the keys of a keyboard. One of the plate members includes clip means for releasably securing copy when the apparatus lies in the second position.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 1 is a perspective view of the keyboard covering and copy holding apparatus of the present invention, showing the apparatus in a first, generally flat configuration for covering a keyboard;

FIG. 2 is a sectional view taken along line 2—2 in FIG. 1;

FIG. 3 is a partial perspective view of the apparatus, showing the apparatus in a second configuration for holding copy;

FIG. 4 is a sectional view taken along line 4—4 in FIG. 3;

FIG. 5 is a partial perspective view of the apparatus, showing a clip for holding copy on the apparatus; and FIG. 6 is a sectional view taken along line 6—6 in FIG. 5.

While the following disclosure describes the invention in connection with one embodiment one should understand that the invention is not limited to this embodiment. Furthermore, one should understand that the drawings are not to scale and that graphic symbols, diagrammatic representations, and fragmentary views, in part, illustrate the embodiment. In certain instances, the disclosure may not include details which are not necessary for an understanding of the present invention.

DETAILED DESCRIPTION OF THE DRAWINGS AND AN EMBODIMENT

Referring now to the drawings, FIG. 1 shows the keyboard covering and copy holding apparatus of the present invention generally at 10. The apparatus includes a first plate member 11 and a second plate member 12 pivotally connected to the first member. The plate member 11 has a rectangular main plate segment 13 and a flange segment 14 which extends perpendicularly of the segment 13 and around three sides of the plate segment 13. The plate member 12 also has a rectangular main plate segment 15 and a flange segment 16 which extends perpendicularly of the segment 15 and around three sides of the plate segment 15.

A first end of the second plate member 12 lies between opposite ends of the flange segment 14 of the member 11 releasably and pivotally connected to the member 11. A pin 17 disposed on one side of the member 12 at the first end of the member 12 and a second pin (not shown) disposed at an opposite side extend into corresponding openings 18 on opposite sides of the member 12 defined by the flange segment 14 to form the pivot connections between the two plate members 11 and 12. The flange segment 14 also defines three other pairs of openings 19, 20 and 21 which receive the pins of the plate member 12, provide alternate pivot locations, and accordingly allow a user to vary the size of the apparatus 10. This feature allows a user to use the apparatus 10 on a variety of keyboards of different size.

The plate members 11 and 12 are one-piece, integrally formed components made of thermoplastic material or any other material of sufficient strength and resiliency. The resiliency provided by the material used allows the flexing shown in FIG. 2. By pushing the ends of the flange segment 16 inwardly of the plate member 12, one may remove the pins from the openings in which they lie and separate the plate members. In a similar manner, one may connect the two plate members 11 and 12 together using any of the pairs of openings 18-21.

The plate members 11 and 12 pivot between two positions, one shown in FIG. 1 and the other shown in FIG. 3. In the position shown in FIG. 1, the plate members 11 and 12 have a flat, elongate configuration, and the flange segments co-operate to define a rectangular band or ring which extends around the keys of a keyboard. (The plate member 12 may also include a second flange segment 22; and the plate member 11 may include a second flange segment 23. These segments 22 and 23 extend perpendicularly of the plate segments 15 and 13, respectively, into the space between the function keys and the other keys of a keyboard.) In the second position shown in FIG. 3, the plate members 11 and 12 lie at an acute angle to each other for supporting copy C.

The plate members 11 and 12 include co-operating means for limiting movement between the two positions shown in FIGS. 1 and 2. The second plate member 12 includes a protrusion 24 at opposite sides of the member which engages a shelf 25, 26, or 27 to limit the movement of one member with respect to the other member as shown in FIG. 3. To limit the pivoting movement in the opposite direction, an edge portion 28 of the plate member 11 engages an edge portion 29 of the plate member 12 as shown in FIG. 1.

To hold copy C in place, the plate member 12 includes a clip portion 30 shown in FIGS. 5 and 6. This portion 30 defines a space 31 into which the upper edges of the copy C extent. (Ribs 32 formed on the inside of the clip portion 30 help secure the copy C in place.) The plate member 11 includes a slot or groove 33 which receives the bottom edges of the copy as shown in FIG. 4.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicants intend to cover any modifications and other embodiments as incorporate those features which constitute the essential features of this invention.

What is claimed is:

1. A keyboard covering and copy holding apparatus comprising: a first plate member; a second plate member pivotally connected to the first plate member; said second plate member being pivotable along a pivot axis between a first position for covering a keyboard in which the second plate member and the first plate member lie generally in end-to-end relation and define a flat configuration and a second position for holding a document in which the second plate member and the first plate member lie at an acute angle; each of said first and second plate members has a main plate segment and a flange segment which extends outwardly of the main plate segment in said first position; the plate segments of the first and second plate members defining an elongate, plate like assembly having an inner surface and an outer surface and the flange segments protruding downwardly from the inner surface the assembly to define a pocket for bounding the keys of a keyboard, the flange segments lying proximate the outer edges of the keys.

2. The apparatus of claim 1 further comprising co-operating means on the first and second plate members for limiting the movement of the members between the first and second positions.

3. The apparatus of claim 2, wherein the co-operating means includes a protruding portion of the first or second member.

4. The apparatus of claim 1, wherein the second plate member is releasably secured and pivotably connected to the first plate member at a plurality of locations on the first plate member.

5. The apparatus of claim 1, wherein one of the plate members includes clip means for releasably securing copy when the apparatus lies in the second position.

6. The apparatus of claim 4, wherein the main plate segment of each plate member has a generally rectangular configuration and the flange segment of each plate member lies only along three sides of the main plate segment with the pivot axis extending along the fourth side.

7. The apparatus of claim 1, wherein the flange segments of the first and second plate members in the first position define a generally rectangular ring which may extend around the keys of a keyboard.

* * * * *